US009563035B2

United States Patent
Lammers Van Toorenburg et al.

(10) Patent No.: US 9,563,035 B2
(45) Date of Patent: Feb. 7, 2017

(54) MIRROR MOUNTING ASSEMBLY FOR MOUNTING A MIRROR IN A LASER RANGEFINDER

(71) Applicant: IKEGPS Group Limited, Mount Cook, Wellington (NZ)

(72) Inventors: Leon Mathieu Lammers Van Toorenburg, Wellington (NZ); Donald Mawson, Wellington (NZ)

(73) Assignee: IKEGPS Group Limited, Mount Cook, Wellington (NZ)

( * ) Notice: Subject to any disclaimer, the term of this patent is extended or adjusted under 35 U.S.C. 154(b) by 0 days.

(21) Appl. No.: 14/677,103

(22) Filed: Apr. 2, 2015

(65) Prior Publication Data
US 2015/0286030 A1    Oct. 8, 2015

Related U.S. Application Data

(60) Provisional application No. 61/974,674, filed on Apr. 3, 2014.

(51) Int. Cl.
| A47F 1/14 | (2006.01) |
| G02B 7/182 | (2006.01) |
| G01S 17/08 | (2006.01) |
| G01S 7/481 | (2006.01) |

(52) U.S. Cl.
CPC ........... *G02B 7/1825* (2013.01); *G01S 7/4811* (2013.01); *G01S 17/08* (2013.01)

(58) Field of Classification Search
CPC ........ H01S 3/025; H01S 3/086; H01S 3/0931; G02B 7/1825; G01S 17/08; G01S 7/4811
See application file for complete search history.

(56) References Cited

U.S. PATENT DOCUMENTS

| 3,404,352 A | 10/1968 | Bowness |
| 3,864,029 A * | 2/1975 | Mohler ................ G02B 7/1825 359/873 |
| 3,953,113 A * | 4/1976 | Shull ...................... H01S 3/086 248/476 |
| 4,653,063 A | 3/1987 | Acharekar et al. |
| 6,386,719 B1 | 5/2002 | Lee |
| 8,553,340 B2 * | 10/2013 | Drost ....................... G03B 3/02 359/798 |
| 8,842,260 B2 * | 9/2014 | Juenemann ........... G01S 7/4811 356/3.01 |
| 8,933,406 B2 * | 1/2015 | Ressler .............. G01B 9/02015 250/339.08 |
| 2011/0279808 A1* | 11/2011 | Dunne .................. G01S 7/4813 356/4.01 |
| 2013/0100124 A1* | 4/2013 | Kim .................... G02B 27/2214 345/419 |

(Continued)

FOREIGN PATENT DOCUMENTS

| GB | 715614 | 9/1954 |
| GB | 2 149 566 | 6/1985 |
| WO | WO 2012/081995 A1 | 6/2012 |

*Primary Examiner* — Amy Sterling
(74) *Attorney, Agent, or Firm* — Merchant & Gould P.C.

(57) ABSTRACT

A mirror mounting assembly for mounting a mirror in a laser rangefinder, comprising: a mirror mount configured for receiving and mounting a mirror and configured such that when connected to the laser rangefinder, the position and/or orientation of the mirror mount relative to the body of the laser rangefinder can be adjusted.

18 Claims, 6 Drawing Sheets

(56) References Cited

U.S. PATENT DOCUMENTS

| | | | |
|---|---|---|---|
| 2013/0206335 A1* | 8/2013 | Renius | C09J 5/00 |
| | | | 156/305 |
| 2015/0122890 A1* | 5/2015 | Olmstead | G06K 7/10603 |
| | | | 235/462.14 |

* cited by examiner

MIRROR MOUNTING ASSEMBLY FOR MOUNTING A MIRROR IN A LASER RANGEFINDER

This application claims benefit of U.S. Provisional Ser. No. 61/974,675, filed 3 Apr. 2014 and which application is incorporated herein by reference. To the extent appropriate, a claim of priority is made to the above disclosed application.

FIELD OF THE INVENTION

This invention relates to a mirror mounting assembly and/or mounting method for mounting a mirror in a laser rangefinder. The invention also relates to a laser rangefinder that has a mirror mounting assembly.

BACKGROUND OF THE INVENTION

The use of laser rangefinding devices is becoming more and more common as technology advances, and devices of this type become smaller and more portable. Laser rangefinding devices generally have a laser emitter unit and a receiver unit mounted in a casing or housing. Laser light is emitted from the emitter unit, passing through a first lens in the casing to the target, the light reflecting and returning to the rangefinder through a second lens, then passing to the receiver unit. Laser rangefinders are generally factory-calibrated by aligning the relative positions of the laser and receiver units. In order that the unit can be used to measure distances as precisely as possible, the alignment should be precise.

The Applicant has proposed a laser rangefinder device having one or more mirrors within the housing to change the direction of the beam before it leaves the housing, and to change the direction of the reflected beam after it enters the housing. That device is disclosed in PCT Application No. PCT/NZ2011/000257, the entire contents of which are hereby incorporated by reference herein. The Applicant's device uses mirrors arranged at generally 45 degrees to the lenses.

In other laser rangefinder devices the laser emitter and the receiver unit are generally moved to calibrate and align the unit.

It is an object of the present invention to provide an improved mirror mounting assembly or method for mounting a mirror in a laser rangefinder, or at least to provide the public or industry with a useful choice. It is a further object of the invention to provide a laser rangefinder that has an improved mirror mounting assembly, or at least to provide the public or industry with a useful choice.

SUMMARY OF THE INVENTION

In a first aspect the invention provides a mirror mounting assembly for mounting a mirror in a laser rangefinder, comprising: a body; a mirror mount configured for receiving and mounting a mirror; the mirror mount configured such that the position and/or orientation of the mirror mount relative to the body of the laser rangefinder can be adjusted.

Preferably the mirror mount is configured so that the angle between the mirror mount and the body of the laser rangefinder can be adjusted.

Preferably the mirror mount is configured so that the relative positions of mirror mount and the body of the laser rangefinder can be adjusted to change an optical path length within the laser rangefinder.

Preferably the mirror mounting assembly includes a plurality of screws arranged to adjust the position of the mirror mount relative to the body of the laser rangefinder. Preferably the screws pass inwardly through the body of the laser rangefinder into the mirror mount. Preferably the screws pass into the rear of the mirror mount. Preferably there are three or more screws. Preferably there are three screws arranged in a triangle.

Preferably the mirror mounting assembly includes a resilient element positioned between the mirror mount and the body of the laser rangefinder in use, the resilient element configured to provide a reaction force when compressed by tightening of the screws.

Preferably the resilient element is a substantially planar or moulded element.

Preferably the resilient element further comprises at least one attachment element for preliminary attachment of the resilient element to the mirror mount, or the body of the laser rangefinder. Preferably the at least one attachment element comprises at least one aperture or slot and the mirror mount or the body of the laser rangefinder comprises at least one corresponding projection. Preferably the resilient element comprises three apertures or slots arranged in a triangular pattern, and the mirror mount comprises three corresponding projections.

Preferably the mirror mount further comprises at least one channel configured to receive an adhesive in flowable form, the channel configured so that an adhesive introduced into the channel in flowable form will span between the body of the laser rangefinder and the mirror mount and solidify to substantially immovably fix their relative positions.

Preferably the mirror mount is configured to hold the mirror generally at 45 degrees to the body of the laser rangefinder when mounted.

This aspect also extends to a laser rangefinder having such a mirror mounting assembly. This aspect also extends to a laser rangefinder having a pair of such mirror mounting assemblies.

In a further aspect the invention provides a mirror mounting assembly for mounting a mirror in a laser rangefinder, comprising: a mirror mount configured for movable connection to the body of the laser rangefinder, and further configured for receiving and mounting a mirror; at least one channel in the mirror mount configured to receive an adhesive, the channel configured so that adhesive introduced into the channel in flowable form will span between the body of the laser rangefinder and the mirror mount and solidify to substantially immovably fix their relative positions.

Preferably the mirror mount is configured so that the angle between the mirror mount and the body of the laser rangefinder can be adjusted.

Preferably the mirror mount is configured so that the relative positions of mirror mount and the body of the laser rangefinder can be adjusted to change an optical path length within the laser rangefinder.

Preferably the mirror mounting assembly includes a plurality of screws arranged to adjust the position of the mirror mount relative to the body of the laser rangefinder.

Preferably the screws pass inwardly through the body of the laser rangefinder into the mirror mount. Preferably the screws pass into the rear of the mirror mount. Preferably there are three or more screws. Preferably there are three screws arranged in a triangle.

Preferably the mirror mounting assembly includes a resilient element positioned between the mirror mount and the body of the laser rangefinder in use, the resilient element configured to provide a reaction force when compressed by tightening of the screws. Preferably the resilient element is a substantially planar or moulded element.

Preferably the resilient element further comprises at least one attachment element for preliminary attachment of the resilient element to either the mirror mount or the body of the laser rangefinder. Preferably the at least one attachment element comprises at least one aperture or slot and the mirror mount or the body of the laser rangefinder comprises at least one corresponding projection. Preferably the resilient element comprises three apertures or slots arranged in a triangular pattern, and the mirror mount comprises three corresponding projections.

Preferably the resilient element includes an aperture aligned, in use, with the channel allowing the adhesive to flow through the aperture to the channel.

Preferably the channel extends through the mirror mount to an exit opening.

Preferably the mount is configured to hold the mirror generally at 45 degrees to the body of the laser rangefinder when mounted.

In another aspect the invention provides a mirror mounting assembly for mounting a mirror in a laser rangefinder, comprising: a mirror mount configured for movable connection to the body of the laser rangefinder, and further configured for receiving and mounting a mirror; a substantially planar resilient element located between the housing mount body to provide a reaction force when a force is applied to either or both of the mirror mount or housing mount body to move one in relation to the other.

Preferably the mirror mount is configured so that the angle between the mirror mount and the body of the laser rangefinder can be adjusted.

Preferably the mirror mount is configured so that the relative positions of mirror mount and the body of the laser rangefinder can be adjusted to change an optical path length within the laser rangefinder.

Preferably the mirror mounting assembly includes a plurality of screws arranged to adjust the position of the mirror mount relative to the body of the laser rangefinder. Preferably the screws pass inwardly through the body of the laser rangefinder into the mirror mount. Preferably the screws pass into the rear of the mirror mount. Preferably there are three or more screws. Preferably there are three screws arranged in a triangle.

Preferably the resilient element further comprises at least one attachment element for preliminary attachment of the resilient element to either the mirror mount or the body of the rangefinder. Preferably the at least one attachment element comprises at least one aperture or slot and the mirror mount or body of the rangefinder comprises at least one corresponding projection. Preferably the resilient element comprises three apertures or slots arranged in a triangular pattern, and the mirror mount comprises three corresponding projections.

Preferably the mirror mount further comprises at least one channel in the mirror mount configured to receive an adhesive in flowable form, the channel configured so that an adhesive introduced into the channel in flowable form will span between the body of the laser rangefinder and the mirror mount and solidify to substantially immovably fix their relative positions.

Preferably the mount is configured to hold the mirror generally at 45 degrees to the body of the laser rangefinder when mounted.

In a further aspect the invention provides a method of permanently connecting a mirror mount to the body of a laser rangefinder, comprising the steps of: moving the mirror mount into the required orientation on the body of the laser rangefinder; injecting an adhesive in flowable form through a channel in the mirror mount to span between the body and mirror mount.

Preferably the method includes the initial step of arranging a biasing element between the mirror mount and the body.

Preferably in the step of moving the mirror mount, the mirror mount is moved against the biasing element to provide a reaction force against the mirror mount.

Preferably the method includes moving the mirror mount against the reaction force of the biasing element, and; releasing the mirror mount in a controlled manner under the influence of the reaction force to achieve the desired mirror position and/or orientation.

Preferably in the step of moving the mirror mount, the angle between the mirror mount and the body of the laser rangefinder is adjusted.

Preferably in the step of moving the mirror mount, an optical path length within the laser rangefinder is adjusted by changing the position of the mirror mount relative to the body of the laser rangefinder.

In another aspect the invention provides a method of permanently connecting a plurality of separate mirror mounts to the body of a laser rangefinder, comprising the steps of: moving the mirror mounts into their required positions and/or orientations on the body of the laser rangefinder; injecting an adhesive in flowable form through channels in the mirror mounts to span between the mirror mounts and the body of the laser rangefinder.

Preferably in the step of injecting an adhesive, the adhesive is injected as a single step operation.

Preferably the method includes the initial step of arranging a biasing element between each mirror mount and the body.

Preferably in the step of moving the mirror mounts, the mirror mounts are moved against the biasing elements to provide a reaction force against the mirror mounts.

Preferably the method includes moving the mirror mounts against the reaction forces of the biasing elements, and; releasing the mirror mounts in a controlled manner under the influence of the reaction forces to achieve the desired mirror positions and/or orientations.

Preferably in the step of moving the mirror mounts, the angles between the mirror mounts and the body of the laser rangefinder are adjusted.

Preferably in the step of moving the mirror mounts, optical path lengths within the laser rangefinder are adjusted by changing the position of the mirror mounts relative to the body of the laser rangefinder.

In a further aspect the invention provides a method of positioning and/or orienting a mirror mount in a laser rangefinder, comprising the steps of: moving the mirror mount against a biasing element that provides a reaction force against the movement of the mirror mount; and releasing the mirror mount in a controlled manner under the influence of the reaction force to achieve at least the desired mirror position and/or orientation.

Preferably the method includes the further step of injecting a solidifying adhesive in flowable form to contact the mirror mount and hold the mirror mount in position once solidified.

Preferably in the step of releasing the mirror mount, the angle and/or position of the mirror mount relative to the body of the laser device is adjusted.

Preferred embodiments are set out in the claims and are incorporated in the description by reference.

BRIEF DESCRIPTION OF THE DRAWINGS

The invention will now be described by way of example only, with reference to the accompanying drawings, in which.

DETAILED DESCRIPTION OF EMBODIMENTS OF THE INVENTION

The invention will be described with reference to a laser rangefinder of the type that is intended for use when mounted on the rear face of a smartphone or tablet or similar device, and which is used in a generally upright alignment—that is, with the longer axis generally perpendicular to a target direction. For example, if the target is in a horizontal direction from the device, the longer axis of the laser rangefinder will be upright or roughly vertical or near vertical, rather than horizontal. However, the invention may be applied in any laser rangefinder requiring the use of mirrors.

Figure 1A:
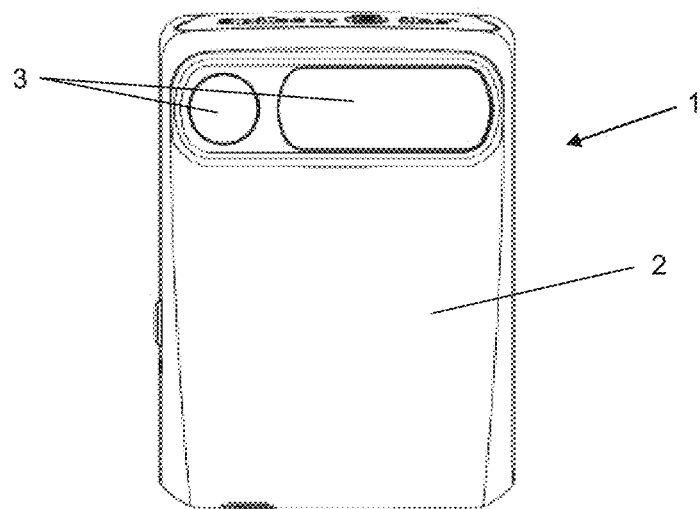
FIGS. 1a-c show a laser rangefinder from the front, left-hand side and top side respectively, the laser rangefinder having a casing with a flat surface or side that allows it to be mounted on the back of a smartphone or tablet.
Figure 1B:
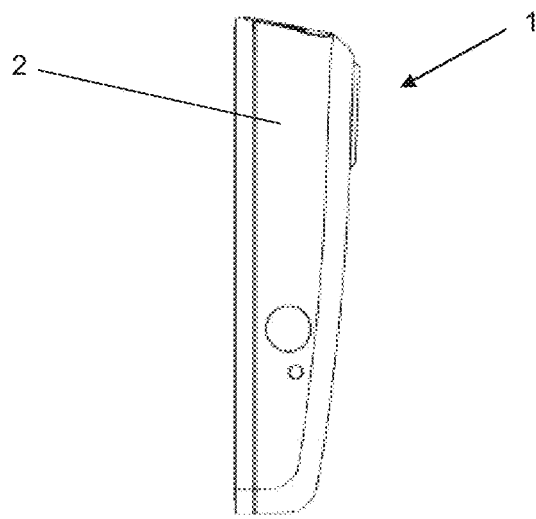
Figure 1C:

A laser rangefinder 1 is shown in FIGS. 1a-1c. The laser rangefinder 1 has a body, casing or housing 2 within which the components of the laser rangefinder 1 are housed. A flat rear face allows the laser rangefinder to be mounted against a tablet or smartphone, or similar device, so that they can be used in conjunction.

A pair of lenses 3 may be mounted in apertures at the top front of the casing 2. In use, the laser beam passes through one lens and back through the other. As shown in FIG. 1a, the laser beam may be emitted through the smaller, left hand lens. The reflected beam may be gathered through the larger, right hand lens.

Figure 2:
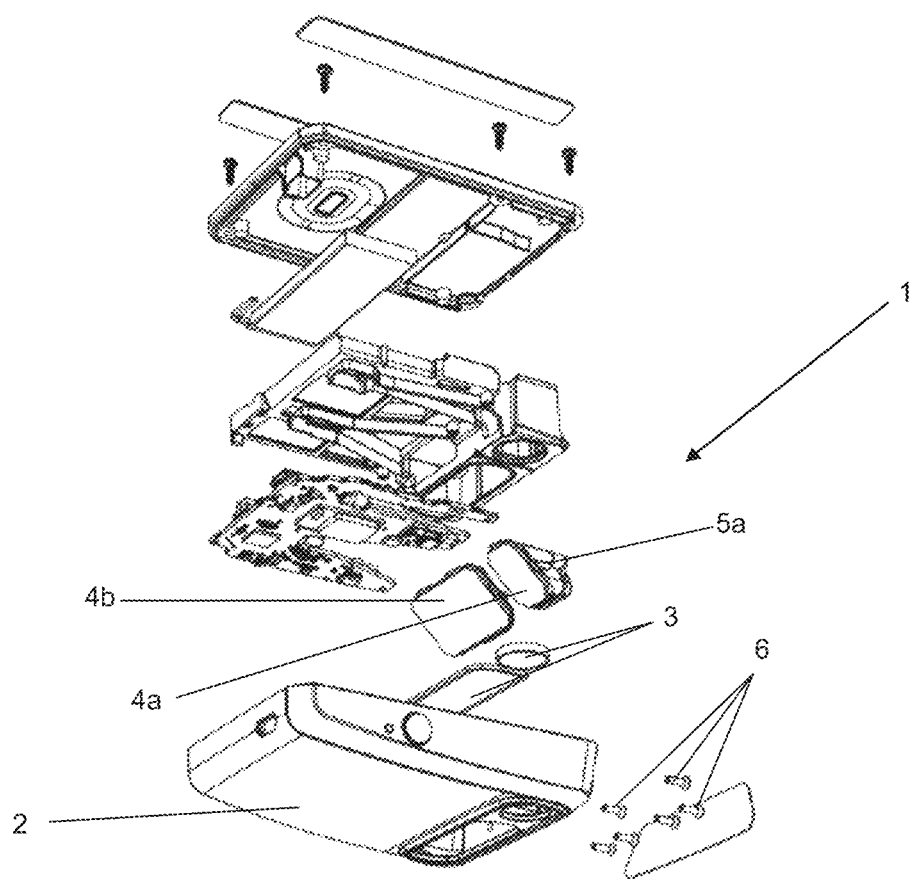
FIG. 2 shows a perspective exploded view from one side and underneath of the laser rangefinder of FIGS. 1a-c, two mirrors shown positioned behind the lenses at a 45-degree angle to reflect laser light passing along the length of the casing and redirect this through one of the lenses, and to receive laser light passing through the other lens and redirect this along the casing.
Figure 3:
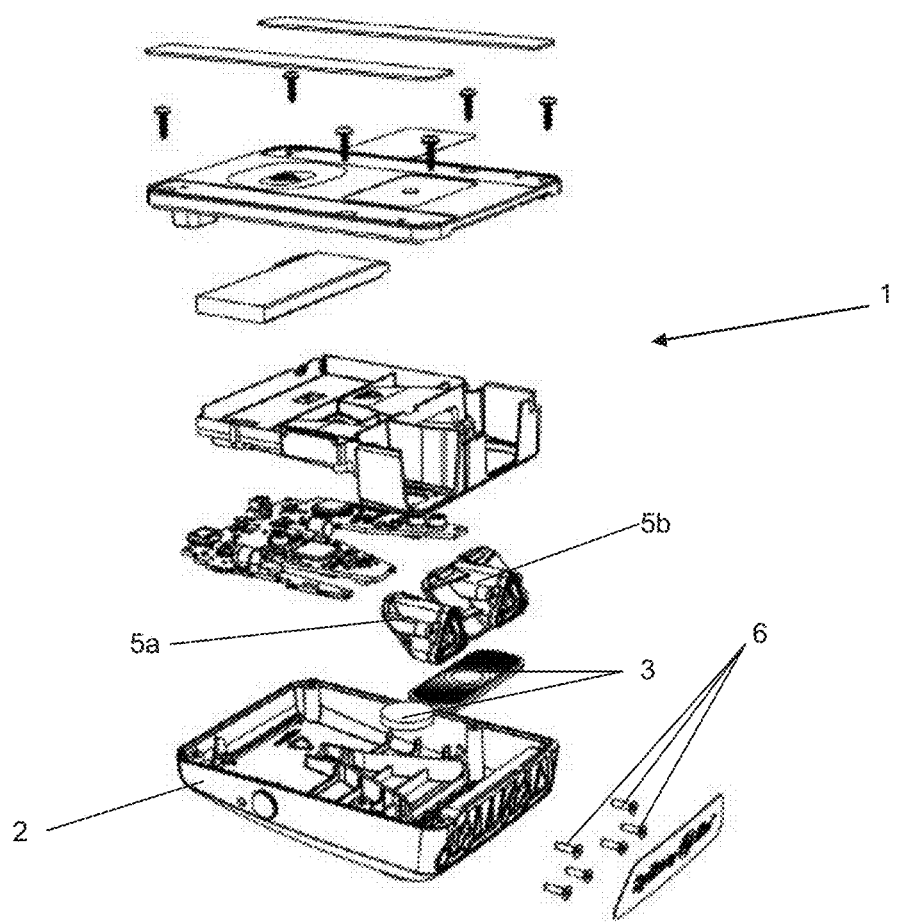
FIG. 3 shows an exploded view of the laser rangefinder of FIGS. 1 and 2 from above and towards the top end, the mirrors adjustably mounted to the top end of the laser rangefinder via mirror mounts, detail of the rear of the mounts and a resilient compression pad located between the rear of each of the mounts and the top end shown, six screws, three on each mount, passing through the top end of the casing surface into the mounts for adjustment and calibration of the position of the mirrors.
Figure 4:
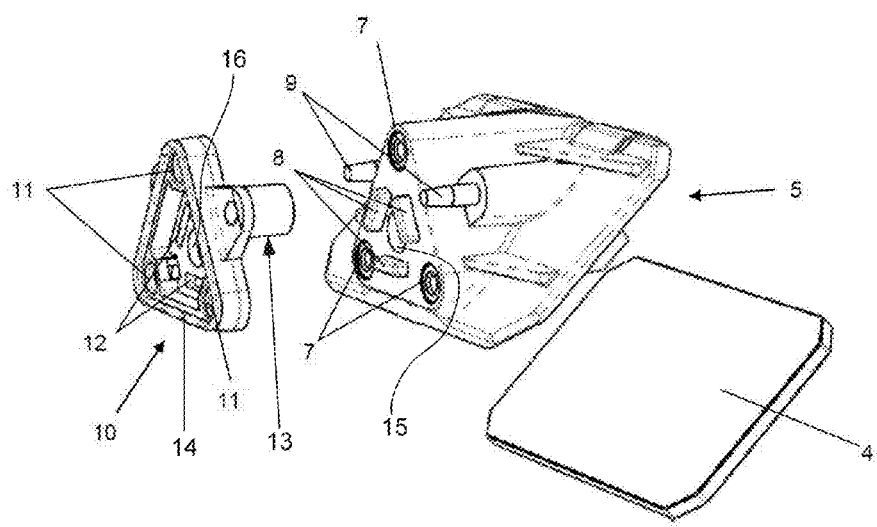
FIG. 4 shows an exploded view from the side and to the rear of one of the mounts, showing detail of the structure of mount and the compression pad.

As shown in FIG. 2, a pair of mirrors 4a, 4b may be mounted directly behind the lenses 3 at generally a 45-degree angle, so that laser light entering the casing 2 is directed along the casing 2 to a receiver at the other end of the casing 2, and laser light from an emitter adjacent to the receiver will pass along the casing and reflect from the mirror to pass out of the casing through the other lens.

Each of the mirrors 4a, 4b may have its own mount—mounts 5a and 5b. These may each be connected to the housing 1 at the top end of the housing by three screws 6 (six screws in total, three for each housing) that pass through the top surface of the housing 1 in an equilateral triangle pattern and into three holes in the rear of the mount. Other numbers of screws or other patterns may be used. However, the triangular pattern is preferred as it allows full adjustment of orientation and/or position. The mounts are described in detail below.

Each of the mirrors 4a, 4b may be glued or otherwise attached to the front surface of its respective mount 5a or 5b. The front surface of the mount 5 may be arranged at generally a 45-degree angle to the body of the mount 5. The rear of the body of the mount 5 may generally form a triangular face the corners of which are defined by three screw holes 7 in an equilateral triangle pattern equivalent to the pattern of the screws 6 in the housing 1 so that the screws 6 can be screwed into the holes 7. Three elongate extensions or projections 8 may be arranged in a triangular pattern inside the triangle formed by the screw holes 7, the bodies of each of the extensions or projections 8 parallel to the nearest triangular side of the triangle formed by the screw holes 7. The base of the triangle may be at the same side of the mount 5 as the inner side of the front face—that is, the face closest to the top end of the housing 1 in use. A pair of further projections 9 may extend from each of the upper sides of the triangle, aligned in parallel with the screw axes. A central aperture 15 is located at the centre of the triangular rear face.

A resilient element or compression pad 10 may be mounted in use on the rear of the body of the mount 5 so that it sits between the between the inner surface of the casing 1 and the rear of the body of the mount 5. The resilient element 10 may have a generally triangular shape. The face of the resilient element 10 towards the mount 5 may be substantially planar, and the resilient element 10 may be sized and shaped to fit against the rear of the body of the mount 5 and may be generally equivalently sized.

The resilient element may be formed by cutting from a resilient material, or may be moulded by any suitable moulding process.

In the embodiment shown, a perimeter lip 14 runs around the outer edge of the resilient element 10, aligned towards the housing 2, and serves to space the resilient element away from the housing 2 (except for contact at the top edge of the lip 14), and also acts as a seal between the resilient element 10 and the housing 2. Three screw holes 11 may be arranged, one at each corner, each aligned with the screw holes 7 in the mount 5. Three apertures or slots 12 pass through the body of the resilient element 10, each equivalent to the elongate extensions or projections 8, and sized and shaped so that the extensions 8 pass through the slots 12. Similarly, a pair of projection receivers 13 may extend from the upper sides of the triangular body, each formed as a hollow cylinder that receives one of the projections 9 in use. A central aperture 16 passes through the centre of the triangular resilient element 10, generally sized with and in use co-located with the central aperture 15 of the mount 5.

The resilient element may be made from any suitable resilient material, such as silicone rubber or similar so that it is deformable and elastic and acts as a biasing member, providing a reaction force against deformation.

For assembly, the resilient element 10 may be preliminarily attached to the mirror mount 5 by aligning the slots or apertures and projection receivers with the corresponding projections and pressing the resilient element onto the mirror mount. In other embodiments a preliminary attachment may be made between the resilient element and a body of the laser rangefinder.

Figure 5A:
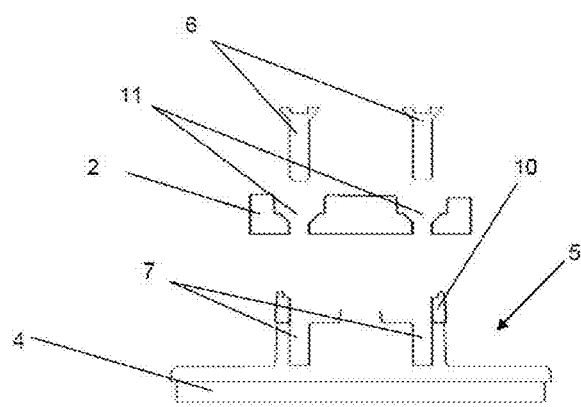
FIG. 5a shows a schematic exploded view of the mount, compression pad, and adjustment screws of FIG. 4 from above.
Figure 5B:
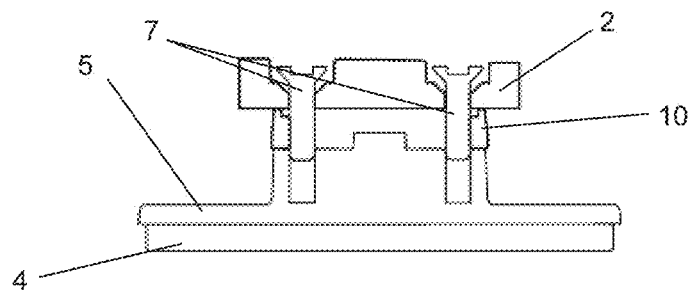
FIG. 5b shows the mount of FIG. 5a with the screws in position and loosely tightened.
Figure 5C:
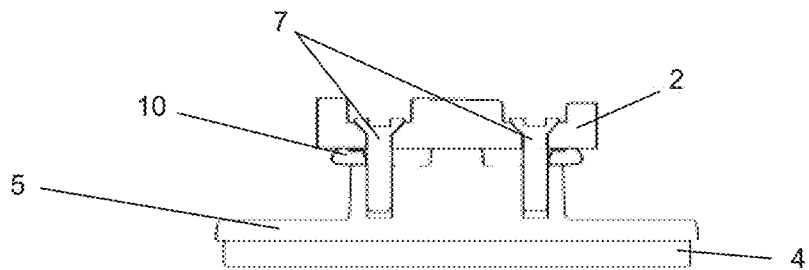
FIG. 5c shows the mount of FIG. 5b with the screws tightened to compress the compression pad between the inner surface of the top of the casing and the rear of the mount.
Figure 5D:
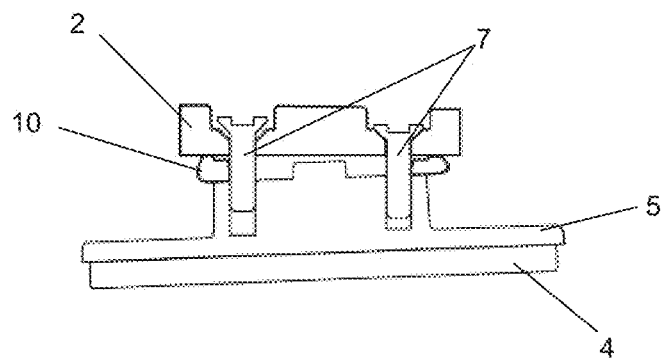
FIG. 5d shows the mount, compression pad, and adjustment screws of FIGS. 5a-c with the screws shown tightened differing amounts to adjust the orientation and/or position of the mount.
Figure 6:
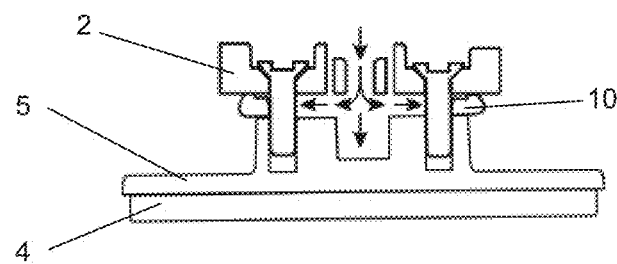
FIG. 6 shows a schematic exploded view of the mount, compression pad, and adjustment screws of FIG. 4 from above, with a liquid epoxy resin being injected into the space between the rear of the mount, the compression pad and the inner surface of the top of the casing, to hold the mirror mount permanently in the current position to which it has been adjusted.

The mirror mount 5 may then be placed in position and the screws threaded through holes in the housing 2, through the holes 11 in the resilient element 10 and into the holes 7 on the mount 5. As the screws 6 are tightened as shown in FIGS. 5*b* and 5*c*, the resilient element 10 is compressed between the mount 5 and the inner surface of the housing 2. The compression of the resilient element 10 provides a reaction force against the screw force. The position of the mirror mount 5 relative to the housing 2 can be adjusted by adjusting the screws 6 in the holes 7, as shown in FIG. 5*d*. The depth of each screw in each hole can be altered to adjust the optical path length between the emitter or receiver and the corresponding lens. Preferably this path length should be equal to the focal length of the lens. Further, the angle of the mirror mount 5 relative to the housing 2 may be adjusted, in both the left-right and up/down orientations. That is, the plane of the mirror can be adjusted freely.

Figure 7:
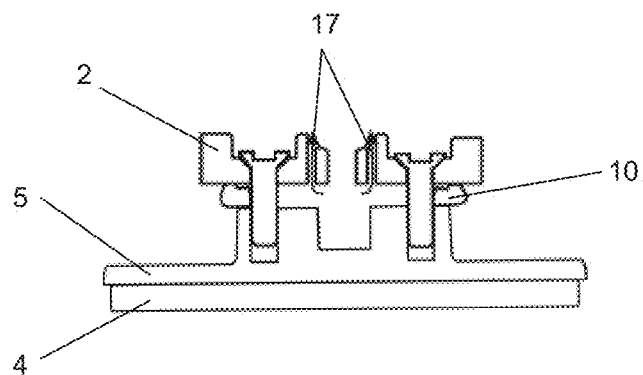
FIG. 7 shows the mount, compression pad, adjustment screws and epoxy resin of FIG. 6 with the space shown full and the resin tracking from vent holes each side of the main injection aperture, indication visually that the space is full.

Once the mirror 4 is in the required position (i.e. the optical path length and orientation are as required), an epoxy resin or other similar solidifying adhesive in pre-solidified or flowable form is injected through holes in the housing 2 on the upper face, directly behind and in line with the apertures 15, 16 on the mount 5 and resilient element 10. The epoxy flows or spreads into the aperture 15, and between the resilient element 10 and the inner face of the housing 2, which collectively form a channel for the epoxy. The channel is effectively closed as the lip 14 of the resilient element provides a seal. The adhesive cannot flow past the seal and remains enclosed within a defined area. The epoxy will also contact the extensions 8 as they extend through the slots 12. As the epoxy is injected it spans between the mount 5, and the housing 2. As the epoxy hardens and solidifies, it immovably fixes the relative positions of mount 5 on the housing 2. The epoxy is injected as single operation. As shown in FIG. 7, when the epoxy starts to seep or track out of vent holes 17 to the sides of the main injection aperture, the channel is full.

In other embodiments, the channel may extend through the mirror mount from an inlet aperture to an outlet aperture. For example, a generally U-shaped channel may be used. When adhesive exits through the outlet aperture, the channel is full.

As outlined above, the injection of adhesive is through the housing 2 directly behind a mount 5 and associated resilient element 10. The pair of mounts 5 for each laser rangefinder 1 could be connected to the housing 2 with a single injection by configuring the resilient elements, mounts and housing so that a single channel is formed from the aperture in the housing through which the epoxy is injected between the inner surface of the housing and the mounts, so that after a single injection step, the epoxy spans between each of the mirror mounts and the housing 2.

The rangefinder may have a body with respect to which the mirror mount is adjustable during assembly. The mirror mounts may be attached directly to the housing, or the body may include a separate mounting base attached to the housing.

While the present invention has been illustrated by the description of the embodiments thereof, and while the embodiments have been described in detail, it is not the intention of the Applicant to restrict or in any way limit the scope of the appended claims to such detail. Further, the above embodiments may be implemented individually, or may be combined where compatible. Additional advantages and modifications, including combinations of the above embodiments, will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

We claim:

1. A mirror mounting assembly for mounting a mirror in a laser rangefinder, comprising:
   a body of a laser rangefinder; and
   a mirror mount configured for receiving and mounting a mirror, wherein the mirror mount is configured such that one or more of the position and the orientation of the mirror mount relative to the body of the laser rangefinder can be adjusted; and
   at least one physical channel configured to receive an adhesive, the physical channel configured so that adhesive introduced into the physical channel in flowable form will span between the body of the laser rangefinder and the mirror mount and solidify to fix their relative positions.

2. A mirror mounting assembly as claimed in claim 1 wherein the mirror mount is configured so that the angle between the mirror mount and the body of the laser rangefinder can be adjusted.

3. A mirror mounting assembly as claimed in claim 1 wherein the mirror mount is configured so that the relative positions of mirror mount and the body of the laser rangefinder can be adjusted to change an optical path length within the laser rangefinder.

4. A mirror mounting assembly as claimed in claim 1 further comprising a plurality of screws arranged to adjust the position of the mirror mount relative to the body of the laser rangefinder.

5. A mirror mounting assembly as claimed in claim 4 wherein the screws pass inwardly through the body of the laser rangefinder into the mirror mount.

6. A mirror mounting assembly as claimed in claim 4 wherein the screws pass into the rear of the mirror mount.

7. A mirror mounting assembly as claimed in claim 4 wherein there are three or more screws.

8. A mirror mounting assembly as claimed in claim 7 wherein there are three screws arranged in a triangle.

9. A mirror mounting assembly as claimed in claim 4 further comprising a resilient element positioned between the mirror mount and the body of the laser rangefinder in use, the resilient element configured to provide a reaction force when compressed by tightening of the screws.

10. A mirror mounting assembly as claimed in claim 1, wherein the physical channel extends from an injection aperture to one or more vent holes.

11. A mirror mounting assembly as claimed in claim 1, wherein the physical channel extends from an injection aperture to an outlet aperture.

12. A mirror mounting assembly for mounting a mirror in a laser rangefinder, comprising:
 a mirror mount configured for movable connection to a body of the laser rangefinder, and further configured for receiving and mounting a mirror;
 a plurality of screws arranged to adjust one or more of the position and the orientation of the mirror mount relative to the body of the laser rangefinder;
 a substantially planar resilient element located between the mirror mount and the body of the laser rangefinder to provide a reaction force when compressed by tightening of the screws; and
 at least one physical channel configured to receive an adhesive, the physical channel configured so that adhesive introduced into the physical channel in flowable form will span between the body of the laser rangefinder and the mirror mount and solidify to fix their relative positions.

13. A mirror mounting assembly as claimed in claim 12 wherein the mirror mount is configured so that the angle between the mirror mount and the body of the laser rangefinder can be adjusted.

14. A mirror mounting assembly as claimed in claim 12 wherein the mirror mount is configured so that the relative positions of mirror mount and the body of the laser rangefinder can be adjusted to change an optical path length within the laser rangefinder.

15. A mirror mounting assembly as claimed in claim 12 wherein there are three or more screws.

16. A mirror mounting assembly as claimed in claim 15 wherein there are three screws arranged in a triangle.

17. A mirror mounting assembly as claimed in claim 12 wherein the resilient element further comprises at least one attachment element for preliminary attachment of the resilient element to either the mirror mount or the body of the rangefinder.

18. A mirror mounting assembly as claimed in claim 17 wherein the resilient element comprises three apertures or slots arranged in a triangular pattern, and the mirror mount comprises three corresponding projections.

* * * * *